Patented May 29, 1945

2,377,071

UNITED STATES PATENT OFFICE 2,377,071

REDUCTION OF NITRO COMPOUNDS TO AMINES BY MEANS OF ALIPHATIC HYDROCARBONS

James Bertrand Castner, Wilmington, Del., and Walter Eastby Lawson, Woodbury, N. J., assignors to E. I. du Pont de Nemours & Company, Wilmington, Del., a corporation of Delaware No Drawing. Application September 8, 1939, Serial No. 293,906

10 Claims. (Cl. 260—580)

This invention relates to the production of organic monoamino compounds and more specifically to the production of aniline.

Organic amino compounds are generally prepared by catalytic reduction of the nitro or nitrile compounds with hydrogen or chemically under conditions yielding hydrogen in the nascent state. For example, aniline may be prepared by reduction of nitrobenzene with iron filings and a regulated amount of hydrochloric acid or by catalytic reduction of nitrobenzene. Iron reduction methods form a large amount of iron sludge from which the aniline is separated with difficulty.

It is an object of this invention to provide a process for the production of organic amino compounds. Another object is to provide a catalytic process for reducing organic nitro compounds to organic amino compounds in which the reduction is effected by means of aliphatic hydrocarbons. A further object is to prepare aniline from nitrobenzene by reduction with hydrocarbon gases in the presence of active contact materials. Other objects will be apparent from the following description of the invention.

These objects are accomplished by means of the following invention which comprises reacting an organic nitro compound with an aliphatic hydrocarbon at a temperature below 450° C. and preferably in the presence of a highly active catalyst which is characterized by the capacity to promote pyrolysis of the hydrocarbon and hydrogenation of the nitro compound at temperatures below 450° C.

The following examples set forth certain well defined instances of the application of this invention. They are, however, not to be considered as limitations thereof, since many modifications may be made without departing from the spirit and scope of this invention.

Example I

During a period of 4.3 hours a total of 123 grams nitrobenzene and 78.8 liters of ethane gas containing a trace of anhydrous ammonia (less than 1% by volume of $NH_3$) and about 5% methane is passed through a heated iron tube containing 50 cc. of granulated (8–14 mesh) nickel-cobalt-cadmium chromite catalyst, prepared as described in Example II of U. S. Patent 2,116,552, and maintained at approximately 400° C. The rate at which the reaction mixture is passed into the reaction chamber will be such that the time of contact between the nitrobenzene and the catalyst is about 3.2 seconds, while the space velocity is about 460 cc. vapor per cc. of catalyst per hour. The product is collected in a receiving flask cooled by immersion in ice water. The effluent gases from the receiving flask are preferably passed through a tube filled with glass wool or similar fibrous material in order to collect finely divided particles of product held in suspension in the gases. The aniline present in the product is extracted with dilute hydrochloric acid, the separated acid solution made alkaline, and extracted with ether. Upon distillation of the ether extract under reduced pressure, 40.2 parts by weight of pure aniline are obtained; $n_D^{20}=1.585$. Unreacted nitrobenzene and a small amount of benzene by-product may be recovered from the acid insoluble residues. Analysis of the effluent gas during operation of the process as given above showed that it contained 6.3% by volume of carbon dioxide, a trace of carbon monoxide, 83.6% ethane and various other constituents which were also present in the original gas used.

Example II

Para-nitrotoluene mixed with a saturated aliphatic hydrocarbon gas comprising about 5% by volume methane, 94% ethane and 1% impurities, is passed over granulated (8–14 mesh) nickel-cadmium chromite prepared as described in Example IV of U. S. Patent 2,116,552, and heated at 400° C. under conditions such that the time of contact between the nitrobenzene and the catalyst is about 3 seconds, while the space velocity is about 500 volumes of gas per volume of catalyst per hour. After operation of the process for a period of 4.5 hours, during which time 137 grams of p-nitrotoluene and 82 liters of the gas have been passed through the catalyst, about 40 grams of p-toluidine along with a quantity of unchanged p-nitrotoluene may be isolated from the product by the procedure described in Example I.

Example III

A mixture comprising 20% by weight of 1-nitropropane and 80% by weight of mixed aliphatic hydrocarbon gases comprising about 23% by volume methane, 20% by volume ethane, 5% by volume ethylene, 16% by volume propane, 10% by volume propylene and 6% by volume butane, is passed over granulated (8–12 mesh) nickel-cobalt-cadmium chromite catalyst heated at 380° to 400° C., under conditions such that the time of contact between the reactants and the catalyst is about 2.8 seconds and the space velocity is about 460 volumes per volume of catalyst per hour. The product of the reaction is passed into a receiving flask cooled with ice water and the effluent gases from the receiving flask bubbled through three consecutive gas wash chambers containing dilute (10%) hydrochloric acid. The acid extraction solutions are washed with ether, treated with excess alkali, and the 1-propylamine distilled by heating. The distilled propylamine was collected in cold water. Titration of an aliquot part indicates that substantial amounts of 1-propylamine have been formed. Unreacted 1-nitropropane may be recovered from the acid-insoluble constituents of the product.

Other mononitro aliphatic compounds, such as nitromethane and nitroethane, may be used in place of nitropropane in the above example and similar results be obtained.

*Example IV*

During the period of one hour a mixture of 74 grams mononitrobenzene and 60 grams of saturated mixed heptanes, B. P. 97° to 98° C., is passed in liquid form into the pre-heater compartment of the reaction chamber heated at 375° to 400° C. and the volatilized mixture then allowed to pass through 250 cc. of granulated nickel-cobalt-cadmium chromite catalyst (8–14 mesh and prepared as described in Example II of U. S. Patent 2,116,552) heated at 375° to 400° C. Under these conditions the time of contact with the catalyst will be about 1.3 seconds, while the space velocity is about 110 volumes of reactant mixture per volume of catalyst per hour. The product is collected and the aniline present in the product is extracted and distilled, as described in Example I. About 12 parts of high quality aniline are obtained along with unchanged nitrobenzene and a slight trace of benzene by-product.

*Example V*

Two hundred sixty-nine grams of nitrobenzene and 252 grams of cyclohexane were introduced into an autoclave. By means of a high temperature heating medium maintained at about 250° C., the autoclave contents were heated for about 4 hours, at the end of which time the pressure within the autoclave mounted to 520 lbs./sq. in. A pressure of around 500 lbs. was then maintained for 1 hour. The autoclave and its contents were then allowed to cool to room temperature. The gas pressure was released and the contents of the autoclave were removed therefrom. Ten grams of aniline was obtained as a product.

*Example VI*

Two hundred forty-six grams of nitrobenzene and 252 grams of cyclohexane were introduced into an autoclave, along with 3 grams of a nickel-cobalt-cadmium chromite as catalyst. The autoclave was heated as in Example V, the maximum pressure attained being 850 lbs. Forty-eight grams of aniline was obtained as a result of this method of operating.

When operating in the vapor phase, any mononitro compound which is stable and volatile at the temperatures used may be reduced by this process. In the case of the mononitro compounds which are subject to explosive decomposition, this hazard may be eliminated by properly diluting the compound with the hydrocarbon gas. From the standpoint of safety in avoiding explosive decomposition, it is desirable to operate at atmospheric pressure or at pressures only slightly higher than atmospheric. Examples of mononitro compounds that may be used to advantage in this reaction are the following: nitrobenzene, ortho-, meta- and para-nitrotoluene, nitroxylenes, nitronaphthalene, nitromethane, nitroethane, nitropropane, nitropropene, nitrobutanes, nitropentanes, nitrohexanes, 1-nitroheptane, mono-nitrodiphenyl, ortho-, meta-, or para-nitro-anisoles.

Liquid phase operation of the process will be generally applicable to mononitrocompounds of relatively high boiling points and to such dinitrocompounds as are sufficiently stable to allow maintenance without decomposition at relatively high temperatures.

A variety of aliphatic hydrocarbons or mixed hydrocarbons of both the open chain and cyclic type, such as methane, propane, butane, isobutane, pentanes, hexanes, cyclohexane, heptanes, and the like, may be used in the process. It has been found that carbon dioxide and a trace of carbon monoxide are the end products of the hydrocarbon oxidation. In a commercial process the carbon dioxide may be removed by alkali scrubbing or by washing with water under pressure and the purified gas can then be recirculated in the process. Unsaturated hydrocarbons appear to be slightly less active as reducing agents than the saturated hydrocarbons, but are intended to be included within the scope of the invention. The use of hydrocarbons which are gaseous under ordinary conditions is preferred when operating in the vapor phase as they are usually less expensive and, in most cases, are more easily separated from the reaction product or the unchanged recovered nitro compound. However, any hydrocarbon capable of existing as a gas under the reacting conditions is operative in the practice of this invention. The addition of a small amount of ammonia to the reducing gas is desirable, since in many cases it has a beneficial effect in promoting the reaction.

It is desirable in carrying out the reaction to use a highly active catalyst; that is, one that will accelerate the reaction and allow operation in a temperature range below 450° C. This is necessary in order to avoid complete decomposition of the reactants. The catalysts may vary somewhat in composition but it is desirable to use agents which are capable of serving both as catalysts for the pyrolysis of hydrocarbons and as catalysts for the reduction of nitro compounds to amines. In general, those catalysts known as the base metal hydrogenation catalysts are operative. These may be either in the form of the metals or as oxides or chromites of the metals. The ferrous metal chromites, preferably modified by addition of cadmium or cadmium chromite, have been found to be particularly useful. Nickel or cobalt, either supported or unsupported, may be used. Such a catalyst may be in the form of a salt. The supports such as kieselguhr, silica, alumina, and the like, may be used. The process is broadly operable within the temperature range of 300° to 450° C. but it is preferred to operate within the range of 350° to 425° C. Although in the practice of this invention the reactants can be passed over the catalyst at rates which may vary over a wide range, for practical reasons it is preferable to operate with a space velocity greater than 100 volumes per volume of catalyst per hour. On the other hand, space velocities as high as 7000 volumes of vapor per volume of catalyst may be satisfactory even though low conversions per pass through the catalyst are obtained. The time of contact is directly dependent on the space velocity under any selected set of operating conditions. From the standpoint of process efficiency, it is preferable to operate with a time of contact ranging from 1 to 4 seconds. Unconverted reactants under any set of conditions may be recovered and recycled in the process.

The reaction is strongly exothermic, and adequate provision must be made for proper temperature control. This may be accomplished by any means known to the art for dissipating the heats of reaction. This may be done in several ways; for example (1) by diluting the reaction mixture with inert gases or using a large excess of the hydrocarbon, (2) by placing the catalyst in metal tubes of small diameter, e. g., one-half inch, so that excess heat may be rapidly transferred to a constant temperature bath surrounding such tubes, (3) by controlling the rate at which the reaction mixture is brought into contact with the catalyst.

This invention provides a valuable new procedure for the reduction of nitro compounds and synthesis of monoamines from mononitro organic compounds and especially for the production of aniline from nitrobenzene and aliphatic amines from alkyl nitro compounds. While particular emphasis has been placed on the operation of the invention as a vapor phase reduction, it should be understood that it is applicable also under liquid phase conditions, particularly when carried out as a batch process. Where the term "aliphatic hydrocarbon" has been used in the specification and claims, it should be understood that this term includes such hydrocarbons of both the open chain and cyclic type.

It is apparent that many widely different embodiments of this invention can be made without departing from the spirit and scope thereof and therefore it is not intended to be limited except as defined in the appended claims.

We claim:

1. The process for the production of primary amines which comprises reacting with an aliphatic hydrocarbon, at an elevated temperature below 450° C., a compound selected from the group consisting of mono-nitro-carbocyclic aromatic and mono-nitro-carboacyclic compounds in which the nitro group is attached directly to a carbon atom, said reacting temperature being sufficiently elevated to cause a reaction between the two components, thereby producing the corresponding primary amine.

2. A process for the production of primary amines which comprises catalytically reacting in the vapor phase a compound selected from the class consisting of mono-nitro-carbocyclic aromatic and mono-nitro-carboacyclic compounds in which the nitro group is attached directly to a carbon atom with an aliphatic hydrocarbon at a temperature between 300° and 450° C.

3. A process in accordance with claim 2 characterized in that the reaction is carried out at a temperature between 350° and 425° C.

4. A process in accordance with claim 2 characterized in that the catalyst contains as an essential catalytic component a ferrous metal chromite.

5. A process in accordance with claim 2 characterized in that the reaction is carried out in the presence of a trace of ammonia.

6. A process in accordance with claim 2 characterized in that the catalyst is a base metal hydrogenation catalyst.

7. A process which comprises bringing a gaseous mixture of a compound selected from the class consisting of mono-nitro-carbocyclic aromatic and mono-nitro-carboacyclic compounds in which the nitro group is attached directly to a carbon atom and an aliphatic hydrocarbon into contact with a highly active pyrolysis-hydrogenation catalyst at a temperature between 300° and 450° C.

8. A process in accordance with claim 7 characterized in that the time of contact between the gaseous reactants and the catalyst is within the range of 1 to 4 seconds.

9. A process for the production of aniline which comprises catalytically reacting in the vapor phase nitro-benzene and an aliphatic hydrocarbon at a temperature between about 300° C. and about 450° C.

10. A process in accordance with claim 9 characterized in that the catalyst is a nickel-cobalt-cadmium chromite and the temperature is maintained within the range of 350° C. to 425° C.

JAMES BERTRAND CASTNER.
WALTER EASTBY LAWSON.